US012809684B2

(12) United States Patent
Nguyen et al.

(10) Patent No.: US 12,809,684 B2
(45) Date of Patent: Nov. 24, 2026

(54) SYSTEMS, METHODS, AND APPARATUS FOR OPERATING COMPUTATIONAL DEVICES

(71) Applicant: Samsung Electronics Co., Ltd., Suwon-si (KR)

(72) Inventors: Marie Mai Nguyen, Pittsburgh, PA (US); Rekha Pitchumani, Oak Hill, VA (US); Yang Seok Ki, Palo Alto, CA (US)

(73) Assignee: SAMSUNG ELECTRONICS CO., LTD. (KR)

( * ) Notice: Subject to any disclaimer, the term of this patent is extended or adjusted under 35 U.S.C. 154(b) by 557 days.

(21) Appl. No.: 18/121,586

(22) Filed: Mar. 14, 2023

(65) Prior Publication Data

US 2024/0168819 A1 May 23, 2024

Related U.S. Application Data

(60) Provisional application No. 63/426,361, filed on Nov. 17, 2022.

(51) Int. Cl.
*G06F 9/50* (2006.01)
*G06F 9/48* (2006.01)

(52) U.S. Cl.
CPC .......... *G06F 9/5044* (2013.01); *G06F 9/4881* (2013.01); *G06F 9/5005* (2013.01); *G06F 2209/509* (2013.01)

(58) Field of Classification Search
None
See application file for complete search history.

(56) References Cited

U.S. PATENT DOCUMENTS 11,281,602 B1 3/2022 Iyer et al.
11,656,780 B2 5/2023 Patil et al.
(Continued)

FOREIGN PATENT DOCUMENTS

CN 113272781 A 8/2021
EP 4155895 A1 * 3/2023 .......... G06F 3/0679
(Continued)

OTHER PUBLICATIONS

Jun et al., "In-Storage Embedded Accelerator for Sparse Pattern Processing", Sep. 13-15, 2016, IEEE. (Year: 2016).*
(Continued)

*Primary Examiner* — Qing Yuan Wu
(74) *Attorney, Agent, or Firm* — Renaissance IP Law Group LLP

(57) ABSTRACT

A method may include performing, at a computational storage device, using first data stored at the computational storage device, a first computational task of a workload, wherein the performing the first computational task of the workload may include generating second data, transferring, from the computational storage device to a computational device, using an interconnect fabric, the second data, and performing, at the computational device, using the second data, a second computational task of the workload. The transferring the second data may include transferring the second data using a root complex of the interconnect fabric. The transferring the second data may include transferring the second data using a switch of the interconnect fabric. The transferring the second data may include performing a peer-to-peer transfer. The transferring the second data may include performing a direct memory access.

20 Claims, 11 Drawing Sheets

(56) References Cited

U.S. PATENT DOCUMENTS

| | | | |
|---|---|---|---|
| 2019/0146837 A1 | 5/2019 | Ki |
| 2021/0117242 A1 | 4/2021 | Van de Groenendaal et al. |
| 2021/0373951 A1 | 12/2021 | Malladi et al. |
| 2022/0014588 A1 | 1/2022 | Guim Bernat et al. |
| 2022/0083257 A1 | 3/2022 | Kachare et al. |
| 2022/0129469 A1 | 4/2022 | Iyer et al. |
| 2022/0147476 A1 | 5/2022 | Nam et al. |
| 2022/0164122 A1 | 5/2022 | Zou et al. |
| 2022/0164286 A1 | 5/2022 | Jeong et al. |
| 2022/0318160 A1 | 10/2022 | Jones |

FOREIGN PATENT DOCUMENTS

| | | |
|---|---|---|
| TW | 202136997 A | 10/2021 |
| WO | 2022133047 A1 | 6/2022 |

OTHER PUBLICATIONS

Weaver et al., "Memory-Side Acceleration and Sparse Compression for Quantized Packed Convolutions", Nov. 2-5, 2022, IEEE. (Year: 2022).*

European Extended Search Report for Application No. 23208274.3, mailed Feb. 26, 2024.

Coughlin, Thomas M et al., "Computing Nearer to Data", Computer, IEEE Computer Society, vol. 55, No. 7, Jun. 2022, pp. 82-87.

Kang, Shin-haeng et al., "An Architecture of Sparse Length Sum Accelerator in AxDIMM," 2022 IEEE 4th International Conference on Artificial Intelligence Circuits and Systems (AICAS), Jun. 2022, pp. 487-490.

Ke, Liu et al., "Near-Memory Processing in Action: Accelerating Personalized Recommendation with AxDIMM," IEEE Micro, Jan. 2022, 8 pages.

Lyu, Fuyuan et al., "OptEmbed: Learning Optimal Embedding Table for Click-through Rate Prediction," CIKM '22: Proceedings of the 31st ACM International Conference on Information & Knowledge Management, Oct. 2022, 11 pages.

Singh, Gagandeep et al., "Near-Memory Computing: Past, Present, and Future", Microprocessors and Microsystems, vol. 71, 2019, 16 pages.

Wilkening, Mark et al., "RecSSD: Near Data Processing for Solid State Drive Based Recommendation Inference," ASPLOS '21: Proceedings of the 26th ACM International Conference on Architectural Support for Programming Languages and Operating Systems, 2021, 13 pages.

* cited by examiner

SYSTEMS, METHODS, AND APPARATUS FOR OPERATING COMPUTATIONAL DEVICES

REFERENCE TO RELATED APPLICATION

This application claims priority to, and the benefit of, U.S. Provisional Patent Application Ser. No. 63/426,361 filed Nov. 17, 2022 which is incorporated by reference.

TECHNICAL FIELD

This disclosure relates generally to computational devices, and more specifically to systems, methods, and apparatus for operating computational devices.

BACKGROUND

A data processing system may include one or more computational devices such as accelerators, computational storage devices, and/or the like. A computational device may store data in memory such as dynamic random access memory (DRAM), storage media such as flash memory media, and/or the like. A computational device may include one or more computational resources that may enable the device to perform computational operations on data stored at the device. A compute operation may involve reading data from, and/or writing data to, memory, storage media, and/or the like.

The above information disclosed in this Background section is only for enhancement of understanding of the background of the inventive principles and therefore it may contain information that does not constitute prior art.

SUMMARY

A method may include performing, at a computational storage device, using first data stored at the computational storage device, a first computational task of a workload, wherein the performing the first computational task of the workload may include generating second data, transferring, from the computational storage device to a computational device, using an interconnect fabric, the second data, and performing, at the computational device, using the second data, a second computational task of the workload. The transferring the second data may include transferring the second data using a root complex of the interconnect fabric. The transferring the second data may include transferring the second data using a switch of the interconnect fabric. The transferring the second data may include performing a peer-to-peer transfer. The transferring the second data may include performing a direct memory access. The method may further include assigning, based on a size of the first data and a memory capacity of the computational device, the first computational task of the workload. The method may further include assigning, based on a performance characteristic of the first computational task of the workload, the first computational task of the workload. The method may further include assigning, based on an operation status of the computational device, the first computational task of the workload. The interconnect fabric may be connected to a host, and the method may further include assigning, based on a memory capacity of the host, the first computational task of the workload. The interconnect fabric may be connected to a host, and the method may further include assigning, based on a operation status of the host, the first computational task of the workload. The workload may include a machine learning workload, and the first computational task of the workload may include a reduce operation. The first computational task of the workload may include a sparse length sum operation. The method may further include performing, at the computational storage device, using the first data, a third computational task of the workload. The first data may be stored, at least partially, in a data structure, and the third computational task of the workload may include updating the data structure.

A storage device may include a storage medium, at least one computational resource, an interconnect interface, and a control circuit configured to perform, using at least one of the at least one the computational resource, using first data stored at the storage device, a computational task of a workload, wherein the computational task of the workload may include generating second data, and transfer, from the storage device to a computational device, using the interconnect interface, the second data. The computational task may include a first computational task of the workload, and the control circuit may be configured to perform, using at least one of the at least one computational resource, a second computational task of the workload. The first data may be stored, at least partially, in a data structure, and the second computational task of the workload may include updating the data structure. The first computational task of the workload may include a summing operation, and the second computational task of the workload may include a gradient operation.

A method may include determining a memory capacity of a first computational device connected to an interconnect fabric, wherein the interconnect fabric may be connected to a second computational device, selecting, based on the memory capacity of the first computational device and a size of first data for a workload, the first computational device, wherein the workload may include a first computational task and a second computational task, and the first computational task generates, using at least a portion of the first data, second data for the second computational task, transferring, to the first computational device, at least a portion of the first data, and performing, based on the selecting, by the first computational device, the first computational task of the workload. The selecting the first computational device may be further based on a performance characteristic of the first computational device and a performance characteristic of the first computational task of the workload. The performance characteristic of the first computational task of the workload may include a latency characteristic. The selecting the first computational device may be further based on an operating status of the first computational device. The operating status of the first computational device may include a utilization of the first computational device. The selecting the first computational device may be further based on a persistency characteristic of the first data. The interconnect fabric may be configured for peer-to-peer communication. The first computational device may include a host or a storage device. The first computational task of the workload may include a summing operation, and the second computational task of the workload may include a gradient operation.

BRIEF DESCRIPTION OF THE DRAWINGS

The figures are not necessarily drawn to scale and elements of similar structures or functions may generally be represented by like reference numerals or portions thereof for illustrative purposes throughout the figures. The figures are only intended to facilitate the description of the various embodiments described herein. The figures do not describe every aspect of the teachings disclosed herein and do not limit the scope of the claims. To prevent the drawings from becoming obscured, not all of the components, connections, and the like may be shown, and not all of the components may have reference numbers. However, patterns of component configurations may be readily apparent from the drawings. The accompanying drawings, together with the specification, illustrate example embodiments of the present disclosure, and, together with the description, serve to explain the principles of the present disclosure.

DETAILED DESCRIPTION

Figure 1:
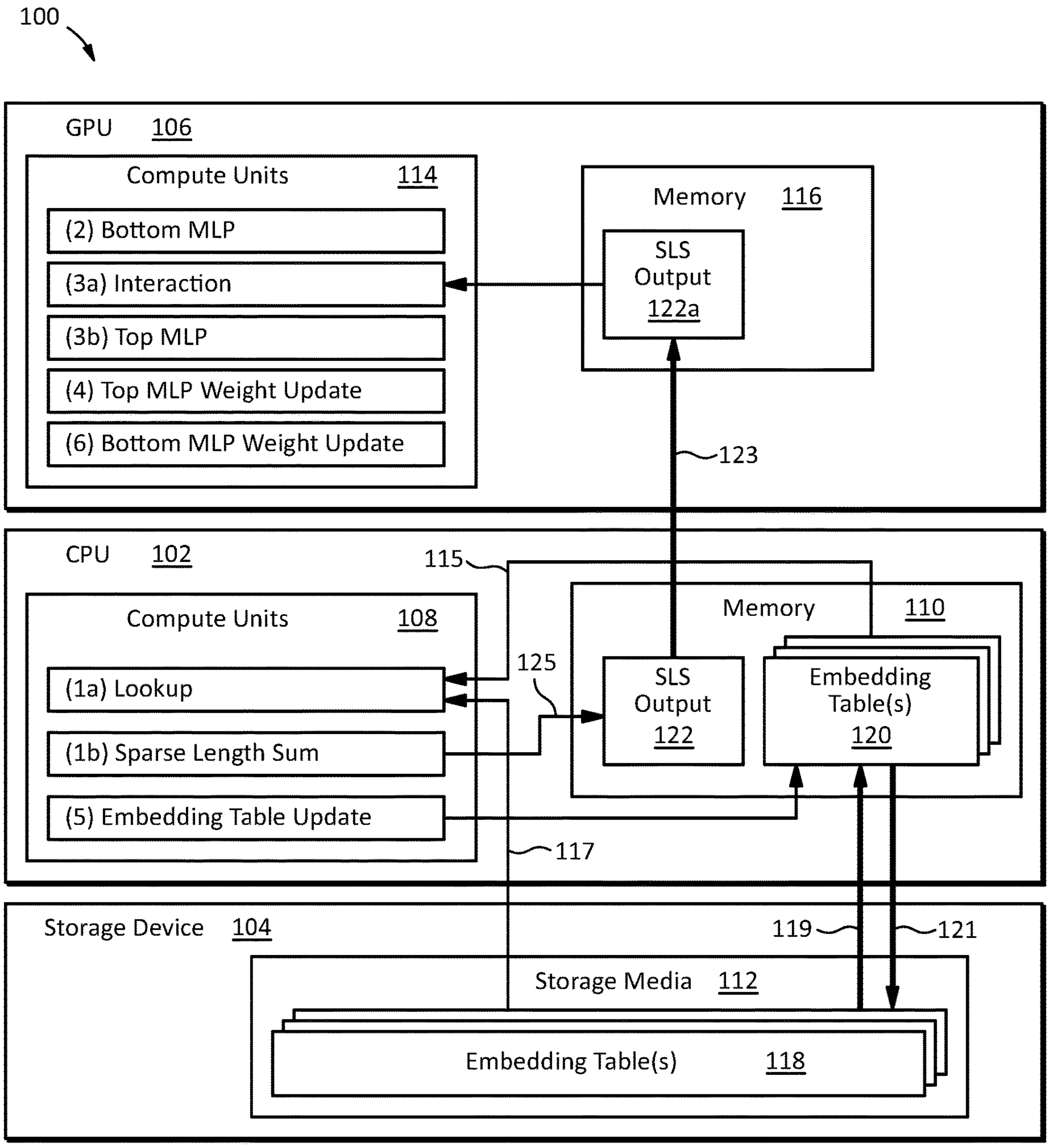
FIG. 1 illustrates an embodiment of a computational system in accordance with example embodiments of the disclosure.

Some computational workloads may be partitioned into tasks, one or more of which may be performed by a computational device such as a central processing unit (CPU), an accelerator device, a computational storage device, and/or the like. For example, a machine learning (ML) workload such as recommendation model training may include a first task such as a sparse length sum (SLS) calculation and a second task such as an interaction.

The first task, which may be performed, for example, by a CPU, may read input data from a data structure (e.g., an embedding table) that may be stored, for example, at a storage device. The first task may generate output data that may be used as input data to the second task which may be performed, for example, by an accelerator device. Depending on the implementation details, this arrangement of tasks may involve relatively high overhead, for example, to transfer data from the storage device to the CPU, and/or to transfer data from the CPU to the accelerator device.

Some of the inventive principles of the disclosure relate to the use of a computational storage device to perform a task involving reading and/or writing data (e.g., reading and/or writing relatively large and/or sparse data from relatively high capacity storage and/or memory.) For example, in a computational scheme in accordance with example embodiments of the disclosure, a first task of a workload may be performed at a computational storage device which may read input data from a data structure (e.g., an embedding table) that may be stored at the computational storage device storage device. Depending on the implementation details, this may reduce overhead, for example, by reading the input data using a relatively high bandwidth internal data path of the computational storage device.

Additionally, or alternatively, output data from a first task performed at a computational storage device may be transferred, using an interconnect fabric, to an accelerator device for use as input data to a second task of a workload. Depending on the implementation details, this may reduce overhead, for example, by transferring data directly from the computational storage device to the accelerator device.

Some additional inventive principles of the disclosure relate to assigning one or more tasks of a workload to a computational device based on one or more characteristics of the task, one or more characteristics of one or more computational devices, one or more operating statuses of one or more computational devices and/or the like. For example, in a task assignment scheme in accordance with example embodiments of the disclosure, one or more candidate computational devices may be selected for a task based on the candidate computational devices having enough memory and/or storage capacity to accommodate an amount of data associated with the task.

Additionally, or alternatively, a computational device may be selected from the candidate computational devices based, for example, on a latency specification for the task. Thus, if two candidate computational devices have enough memory and/or storage capacity to accommodate the amount of data associated with the task, and the task is relatively sensitive to latency, a first one of the candidate computational devices having relatively higher throughput may be selected for the task.

Additionally, or alternatively, a computational device may be selected from the candidate computational devices based, for example, on one or more utilization levels of the candidate computational devices. For example, if the first candidate computational device having higher throughput has a relatively high utilization (e.g., is relatively busy), a second one of the candidate computational devices having relatively lower throughput but lower utilization may be selected for the task.

Additionally, or alternatively, a computational device may be selected from the candidate computational devices based, for example, on a persistency specification for the task. For example, if the data associated with the task includes persistent data, one of the candidate computational devices having persistent memory and/or storage may be selected for the task.

This disclosure encompasses numerous inventive principles relating to operating computational devices. The principles disclosed herein may have independent utility and may be embodied individually, and not every embodiment may utilize every principle. Moreover, the principles may also be embodied in various combinations, some of which may amplify some benefits of the individual principles in a synergistic manner. For example, some embodiments that may transfer output data from a first task performed at computational storage device to an accelerator device for use by a second task may also implement one or more complementary features such as assigning one or more tasks of a workload to a computational device based on one or more characteristics of the task, one or more characteristics of one or more computational devices, one or more operating statuses of one or more computational devices and/or the like.

For purposes of illustration, some embodiments may be described in the context some specific implementation details such as machine learning workloads, communication protocols such as Compute Express Link (CXL), and/or the like. However, the principles are not limited to these or any other specific implementation details.

Table 1 illustrates a first embodiment of a recommendation model training workload in accordance with example embodiments of the disclosure.

TABLE 1

| Task | Operation(s) | Pass |
|---|---|---|
| (1) | Lookup and Sparse Length Sum | Forward |
| (2) | Bottom Multi-Layer Perceptron | |
| (3a) | Interaction | |
| (3b) | Top Multi-Layer Perceptron | |
| (4) | Top Multi-Layer Perceptron Update | Backward |
| (5) | Embedding Table Weight Update | |
| (6) | Bottom Multi-Layer Perceptron Update | |

In some embodiments, the workload illustrated in Table 1 may include one or more of the following tasks.

Task (1) may include one or more lookup operations that may involve reading input data (e.g., categorical data) from one or more embedding tables. In some embodiments, embedding tables may be relatively large, but input data stored in embedding tables may be relatively sparse. In some embodiments, a recommendation model may use embedding to process sparse features that may represent categorical data. For example, one or more categorical features may be represented by one or more embedding vectors (e.g., rows of an embedding table). Additionally, or alternatively, task (1) may include one or more sparse length sum (SLS) calculations that may involve input summing data read from one or more embedding tables. Depending on the implementation details, an SLS operation may generate a relatively dense representation (e.g., of one or more features).

Task (2) may include one or more bottom Multi-layer Perceptron (MLP) operations to process relatively dense features, continuous inputs, and/or the like. In some embodiments, a bottom MLP operation may transform dense features, continuous inputs, and/or the like to generate one or more representations that may have the same or similar lengths as one or more embedding vectors.

Task (3a) may include one or more interactions (e.g., feature interactions), for example, by combining one or more outputs of one or more SLS operations and/or one or more outputs of one or more MLP operations. In some embodiments, one or more interaction operations may include one or more concatenation operations, summing operations, and/or the like.

Task (3b) may include one or more top MLP operations. In some embodiments, one or more top MLP operations may receive one or more outputs from one or more interactions, for example, to find an event probability, capture one or more interactions of features, and/or the like.

Task (4) may include one or more top MLP update operations that may use one or more outputs from one or more interactions and/or top MLPs to update one or more parameters (e.g., weights, biases, and/or the like) of one or more top MLPs, for example, using backward pass information.

Task (5) may include one or more gradient computation operations, for example, to compute one or more gradients for one or more rows (e.g., vectors) of one or more embedding tables. In some embodiments, a gradient computation may use one or more SLS outputs and/or embedding table data is inputs. Additionally, or alternatively, task (5) may include one or more write operations that may write one or more gradients to one or more rows (e.g., vectors) of one or more embedding tables.

Task (6) may include one or more bottom MLP update operations that may use, for example, using backward pass information to update one or more parameters (e.g., weights, biases, and/or the like) of one or more bottom MLPs.

The tasks illustrated in Table 1 are not necessarily dependent on the sequence of numbers and/or letter used to identify the tasks. Thus, some tasks may run in parallel (e.g., concurrently), whereas some other tasks may depend on an output from another task to begin. For example, in some embodiments, tasks (1) and (2) may run at least partially in parallel, whereas task (3) may not begin until tasks (1) and (2) are at least partially completed. In some embodiments, a synchronization mechanism may be used to coordinate some tasks that may run at least partially in parallel. For example, a GPU running task (2) may send a notification when task (2) is at least partially completed, and a CPU running task (1) may send a notification when task (1) is at least partially completed, thus enabling a GPU running task (3) to begin using one or more outputs of task (1) and/or task (2). In some embodiments, a synchronization mechanism may be implemented by a host (e.g., a CPU) and/or an application running on a host.

In some embodiments, the workload illustrated in Table 1 may be used with a deep learning recommendation model (DLRM). In some embodiments, tasks (1), (2), (3a), and/or (3b) may be characterized as forward pass operations, whereas tasks (4), (5), and/or (6) may be characterized as backward pass operations. Some embodiments may implement a backpropagation process in which, for one or more forward passes through a model, one or more backward passes may be performed, for example, to adjust one or more parameters (e.g., weights, biases, and/or the like) of the model.

FIG. 1 illustrates an embodiment of a computational system in accordance with example embodiments of the disclosure. The system 100 illustrated in FIG. 1 may include one or more CPUs 102, one or more storage devices 104, and/or one or more graphics processing units (GPUs) 106. A CPU 102 may include one or more compute units 108 and/or memory (e.g., DRAM) 110. A storage device 104 may include storage media 112. A GPU 106 may include one or more compute units 114 and/or memory 116.

For purposes of illustration, the system 100 may be configured for a machine learning workload, specifically, a recommendation model training workload such as the workload illustrated in Table 1. The workload may include a first task (1) that may be performed, for example, by one or more compute units 108 of the CPU 102. The first task (1) may include a lookup operation (1a) in which the one or more compute units 108 of the CPU 102 may read data (e.g., categorical data) from one or more embedding tables 120 stored in the memory 110 of the CPU 102 as shown by arrow 115 and/or from one or more embedding tables 118 stored in the storage media 112 of the storage device 104 as shown by arrow 117. In some embodiments, data in one or more embedding tables 118 stored in the storage media 112 of the storage device 104 may be transferred (e.g., copied) to the memory 110 of the CPU 102 as shown by arrow 119.

Additionally, or alternatively, the first task (1) may include a sparse length sum (SLS) operation (1b) in which one or more compute units 108 of the CPU 102 may perform one or more SLS calculations on data obtained by the lookup operation. In some embodiments, an SLS calculation may involve summing data read from one or more embedding tables 118 and/or 120. The SLS operation may generate output data 122 that may be stored, for example, in the memory 110 of the CPU 102 as shown by arrow 125.

In some embodiments, some or all of the memory 110 of the CPU 102 may operate as a cache for the storage media 112 of the storage device 104. For example, most or all of the embedding tables, or portions thereof, used by the first task (1) may be stored in the storage media 112 of the storage device 104 which may have a relatively large storage capacity. Some of the embedding tables, or portions thereof, (e.g., more frequently accessed data which may be referred to as hot data) may be cached in the memory 110 of the CPU 102.

The workload may include a second task (2) that may be performed, for example, by one or more compute units 114 of the GPU 106. The second task (2) may include one or more bottom multi-layer perceptron (MLP) operations that may use input data (e.g., relatively dense features, continuous inputs, and/or the like) stored in memory 116.

The workload may include a third task (3) that may be performed, for example, by one or more compute units 114 of the GPU 106. In some embodiments, the third task (3) may include one or more interaction operations (3a). One or more outputs from a bottom MLP operation may be used as one or more inputs to an interaction operation (3a). Additionally, or alternatively, output data **122*a* from an SLS operation may be stored in memory 116 and used as one or more inputs to an interaction operation (3a). Some or all of the SLS output data 122 stored in memory 116 may be transferred from the memory 110 of the CPU 102 to the memory 116 of the GPU 106 and stored as SLS output data 122*a* as shown by arrow 123**.

Additionally, or alternatively, the third task (3) may include one or more top MLP operations (3b). In some embodiments, one or more outputs from an interaction operation may be used as one or more inputs to a top MLP operation.

The workload may include a fourth task (4) that may be performed, for example, by one or more compute units 114 of the GPU 106. The fourth task (4) may include one or more update operations for one or more top MLPs, for example, using backward pass information to adjust one or more parameters, weights, biases, and/or the like, of a top MLP.

The workload may include a fifth task (5) that may be performed, for example, by one or more compute units 108 of a CPU 102. The fifth task (5) may include one or more embedding table update operations. An embedding table update operation may include one or more gradient calculations which may use output data 122 from one or more SLS operations and/or data from one or more embedding tables 118 and/or 120 as input. An embedding table update operation may include one or more write operations in which one or more outputs from one or more gradient calculations may be written to one or more embedding tables 118 and/or 120. In some embodiments, one or more outputs from one or more gradient calculations performed by a CPU 102 may be transferred (e.g., copied) to a storage device 104 as shown by arrow 121.

The workload may include a sixth task (6) that may be performed, for example, by one or more compute units 114 of the CPU 106. The sixth task (6) may include one or more update operations for one or more bottom MLPs, for example, using backward pass information to adjust one or more parameters, weights, biases, and/or the like, of a bottom MLP.

In some embodiments, a CPU 106 may have relatively greater computational capabilities than a CPU 102. However, some or all of the data stored in the embedding tables 118 and/or 120 may be too large to store in the memory 116 of a CPU 106 and/or the memory 110 of a CPU 102. Thus, some or all of the embedding tables may be stored in storage media 112 of one or more storage devices 104. The data in the embedding tables 118 stored in the one or more storage devices 104 may be processed by a CPU 102 in portions, for example, by copying a portion of data stored in the embedding tables 118 from the storage device 104 to the memory 110 of the CPU 102 as shown by arrow 119. The CPU 102 may use one or more compute units 108 to perform an SLS operation on the portion of embedding table data 120 that was copied to the memory 110. One or more SLS operations may generate SLS output data 122 that may be smaller than the embedding table data 120. Thus, depending on the implementation details, the SLS output data 122 may fit in the memory 116 of a CPU 106 when the SLS output data 122 is transferred as **122*a* from the CPU 102 to the CPU 106**.

However, transferring data from one or more storage devices 104 to a CPU 102 may involve CPU utilization, for example, overhead time involved in copying data in embedding tables 118 in a storage device 104 to a memory 110 in CPU 102. Depending on the implementation details, this may prevent the CPU 102 from performing other operations (e.g., SLS operations) while the CPU 102 is busy copying data to and/or from a storage device 104.

Moreover, transferring SLS output data 122 from a CPU 102 to a GPU 106 may involve CPU and/or CPU utilization, for example, overhead time involved in copying SLS output data 122 from memory 110 in a CPU 102 to memory 116 in a GPU 106. Depending on the implementation details, this may prevent the CPU 106 from performing other operations (e.g., MP operations, interaction operations, and/or the like) while the CPU 106 is busy copying data to and/or from a CPU 102.

Figure 2:
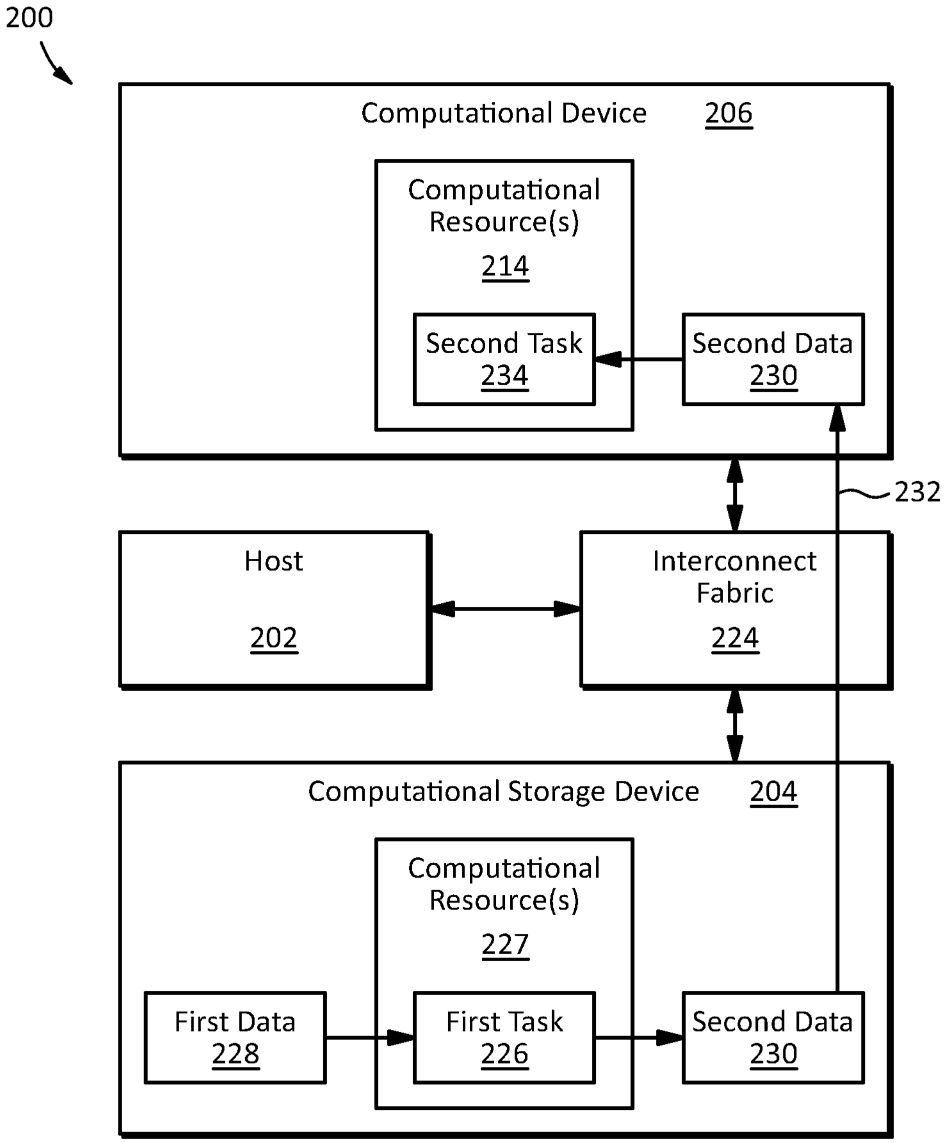
FIG. 2 illustrates an embodiment of a computational system including a computational storage device in accordance with example embodiments of the disclosure.

FIG. 2 illustrates an embodiment of a computational system including a computational storage device in accordance with example embodiments of the disclosure. The system 200 illustrated in FIG. 2 may include one or more computational devices 206, one or more hosts 202, and/or one or more computational storage devices 204. One or more computational devices 206, hosts 202, and/or computational storage devices 204 may communicate using an interconnect fabric 224. A computational device 206 may include one or more computational resources 214. A computational storage device 204 may include one or more computational resources 227.

In some embodiments, the system 200 may be configured for any type of workload that may involve relatively large data storage capacity, and/or be divided, at least partially, into one or more tasks that may involve accessing (e.g., reading and/or writing) relatively large amounts of stored data. For example, in some embodiments, the system 200 may be configured to perform a recommendation model training workload such as the workload illustrated in Table 1. In other embodiments, however, the system 200 may be configured for other types of workloads including other machine learning workloads, artificial intelligence workloads, natural language processing (e.g., recognition, generation, and/or the like) workloads, and/or the like.

A computational storage device 204 may perform a first computational task 226 of a workload. The first computational task 226 may receive first data 228 as an input and generate second data 230 as an output. The first computational task 226 may be performed, for example, using one or more computational resources 227. The second data 230 may be transferred to the computational device 206 using the interconnect fabric 224 as shown by arrow 232. In some embodiments, the interconnect fabric 224 may transfer the second data 230 to the computational device 206 directly, for example, without involvement, intervention, processor utilization (e.g., CPU utilization), and/or the like, by a host 202. The computational device 206 may perform a second computational task 234 of the workload using the second data 230 as input. The second computational task 234 may be performed, for example, using one or more computational resources 214.

The system 200 illustrated in FIG. 2 may be used, for example, with any type of workload that may be partitioned into tasks that may be performed the computational device 206 and/or the computational storage device 204, that may involve relatively high data storage capacity, and/or that may involved read and/or write accesses of the relatively high data storage capacity. In some embodiments, there may be overlap in operations performed by tasks that are partitioned from a workload. Thus, in some embodiments, a task that is partitioned from a workload may refer to a task that is at least partially partitioned from a workload.

Although the system 200 illustrated in FIG. 2 is not limited to any specific type of workload, an embodiment that is configured for a recommendation model training workload may operate as follows. The first task 226 may include one or more lookup and/or SLS calculations, and/or the second task 234 may include one or more interaction operations. The first data 228 stored at the computational storage device 204 may include one or more embedding tables, and/or the second data 230 may include SLS output data from one or more SLS calculations in the first task 226. Some or all of the SLS output data 230 may be transferred (e.g., directly) to the computational device 206 using the interconnect fabric 224.

Depending on the implementation details, performing one or more lookup and/or SLS calculations at a computational storage device 204 at which embedding table data is stored may reduce or eliminate data transfer overhead (e.g., data copy overhead such as that involved in copying embedding table data from the storage device 104 to the CPU 102 as illustrated by arrow 119 in FIG. 1). Additionally, or alternatively, using the interconnect fabric 224 to transfer SLS output data from the computational storage device 204 to the computational device 206 (e.g., directly from the computational storage device 204 to the computational device 206) may reduce or eliminate data transfer overhead (e.g., data copy overhead such that involved in copying SLS output data 122 from the CPU 102 to the GPU 106 as illustrated by arrow 123 in FIG. 1).

A computational storage device 204 may be implemented with any type of storage device using any type of memory and/or storage media including any other type of solid state media, magnetic media, optical media, and/or the like. For example, in some embodiments, a storage device may be implemented as an SSD based not-AND (NAND) flash memory, persistent memory (PMEM) such as cross-gridded nonvolatile memory, memory with bulk resistance change, phase change memory (PCM), dynamic random access memory (DRAM), and/or the like, and/or any combination thereof.

Any of the computational storage devices disclosed herein may be implemented in any form factor such as 3.5 inch, 2.5 inch, 1.8 inch, M.2, Enterprise and Data Center SSD Form Factor (EDSFF), NF1, and/or the like, using any connector configuration such as Serial ATA (SATA), Small Computer System Interface (SCSI), Serial Attached SCSI (SAS), U.2, and/or the like. Any of the storage devices disclosed herein may be implemented entirely or partially with, and/or used in connection with, a server chassis, server rack, dataroom, datacenter, edge datacenter, mobile edge datacenter, and/or any combinations thereof. In some embodiments, a computational storage device may be implemented as a computational storage drive (CSD), a computational storage processor (CSP), and/or a computational storage array (CSA).

In some embodiments, a computational storage device 204 may be implemented with a device other than a storage device, for example, any type of device that may include, or have access to, memory, storage media, and/or the like, to store an amount of data that may be processed by one or more computational resources 227. Examples may include memory expansion and/or buffer devices such as CXL type 2 and/or CXL type 3 devices, as well as CXL type 1 devices that may have access to memory, storage media, and/or the like.

A computational device 206 may be implemented with any type of device such as an accelerator device, a storage device (e.g., a computational storage device), a network device (e.g., a network interface card (NIC)), a CPU, a GPU, a neural processing unit (NPU), a tensor processing unit (TPU), a data processing unit (DPU) and/or the like, or multiples and/or combination thereof.

Computational resources 227 and/or 214 may be implemented with any component or combination of components that may perform operations on data such as combinational logic, sequential logic, timers, counters, registers, state machines, complex programmable logic devices (CPLDs), field programmable gate arrays (FPGAs), application specific integrated circuits (ASICs), embedded processors, microcontrollers, central processing units (CPUs) such as complex instruction set computer (CISC) processors (e.g., x86 processors) and/or a reduced instruction set computer (RISC) processors such as ARM processors, and/or the like, and/or combinations thereof.

A host 202 may be implemented with any component or combination of components such as a compute server, a storage server, a network server, a cloud server, and/or the like, a node such as a storage node, a computer such as a workstation, a personal computer, a tablet, a smartphone, and/or the like, or multiples and/or combinations thereof.

In some embodiments, a host 202 may control an overall operation of the system 200 illustrated in FIG. 2. For example, a recommendation application running on a CPU at a host may implement a recommendation model that may include one or more training workloads, inference workloads, and/or the like. The recommendation application may offload one or more tasks, operations, and/or the like, to one or more computational devices 206 and/or computational storage devices 204, for example, the first task 226 and/or the second task 234 as illustrated in FIG. 2. In some embodiments, a host 202 and/or a recommendation application running at host 202 may configure the interconnect fabric 224 to perform data transfers between any of the components illustrated in FIG. 2. For example, a host 202 may configure the interconnect fabric 224 to transfer the second data 230 from a computational storage device 204 directly to a computational device 206.

The interconnect fabric 224 may be implemented with one or more interconnects, one or more networks, a network of networks (e.g., an internet), and/or the like, or a combination thereof, using any type of interface and/or protocol. For example, the interconnect fabric 224 may be implemented with Peripheral Component Interconnect Express (PCIe), NVMe, NVMe-over-fabric (NVMe-oF), Ethernet, Transmission Control Protocol/Internet Protocol (TCP/IP), Direct Memory Access (DMA) Remote DMA (RDMA), RDMA over Converged Ethernet (ROCE), FibreChannel, InfiniBand, Serial ATA (SATA), Small Computer Systems Interface (SCSI), Serial Attached SCSI (SAS), iWARP, Compute Express Link (CXL), and/or a coherent protocol such as CXL.mem, CXL.cache, CXL.IO and/or the like, Gen-Z, Open Coherent Accelerator Processor Interface (OpenCAPI), Cache Coherent Interconnect for Accelerators (CCIX), and/or the like, Advanced eXtensible Interface (AXI), any generation of wireless network including 2G, 3G, 4G, 5G, 6G, and/or the like, any generation of Wi-Fi, Bluetooth, near-field communication (NFC), and/or the like, or any combination thereof. In some embodiments, the interconnect fabric 224 may include one or more root complexes, switches, hubs, nodes, routers, and/or the like.

In some embodiments, the interconnect fabric 224 may be configured to transfer data directly between components, for example, without involvement, intervention, processor utilization (e.g., CPU utilization), and/or the like, by a host 202. For example, in an embodiment implemented at least partially with CXL, the interconnect fabric 224 may be configured to transfer the second data 230 from a computational storage device 204 directly to a computational device 206, for example, using a CXL switch, a PCIe root complex, a PCIe switch, PCIe peer-to-peer (P2P) communication, CXL P2P communication, and/or the like.

Figure 3:
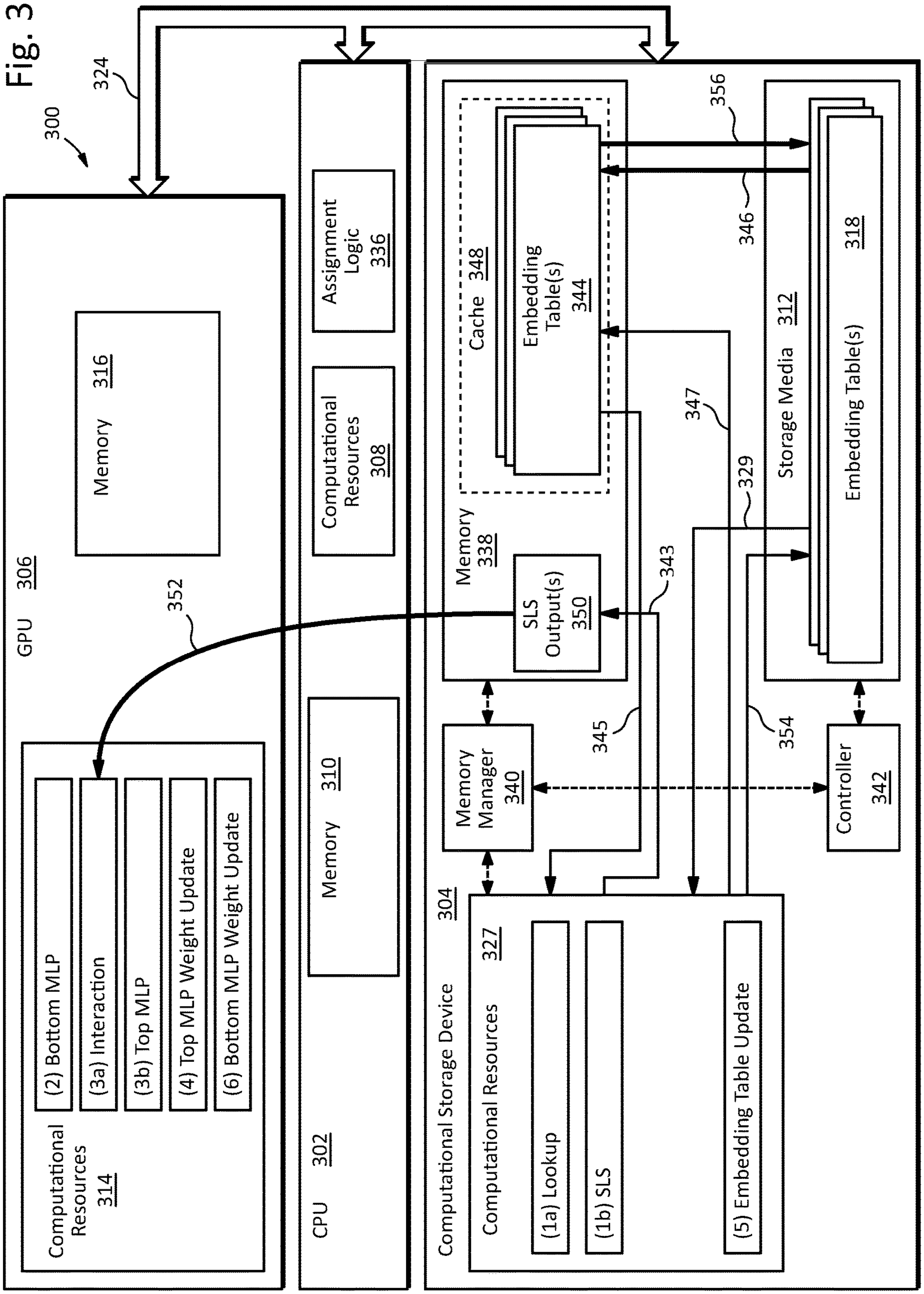
FIG. 3 illustrates a first example embodiment of a computational system including a computational storage device in accordance with example embodiments of the disclosure.

FIG. 3 illustrates a first example embodiment of a computational system including a computational storage device in accordance with example embodiments of the disclosure. The system 300 illustrated in FIG. 3 may be used, for example, to implement the system 200 illustrated in FIG. 2. For purposes of illustrating the inventive principles, the embodiment illustrated in FIG. 3 may be described in the context of certain implementation details such as a host implemented with a CPU, a computational device implemented with a GPU, a workload implemented as a recommendation model training workload, but the inventive principles are not limited to these or any other implementation details.

Referring to FIG. 3, the system 300 may include one or more GPUs or other computational devices 306, one or more CPUs or other hosts 302, and/or one or more computational storage devices 304. One or more GPUs 306, CPUs 302, and/or computational storage devices 304 may communicate using an interconnect fabric 324.

A GPU 306 may include memory 316 and/or one or more computational resources 314. A CPU 302 may include memory 310 and/or one or more computational resources 308. A computational storage device 304 may include storage media 312, one or more computational resources 327, and/or a controller 342. A controller 342 may control one or more operations of the computational storage device 304. In some embodiments, a controller 342 may be implemented, at least in part, with a media translation layer (e.g., a flash translation layer (FTL) in an embodiment in which at least a portion of the storage media 312 is implemented with flash memory).

In some embodiments, a computational storage device 304 may include memory 338, and/or a memory manager 340 that may control one or more operations of memory 338. For example, a memory manager 340 may control one or more accesses of memory 338 by one or more computational resources 327.

In some embodiments, a CPU 302 may include assignment logic 336 that may control, at least in part, an assignment, scheduling, order, timing, and/or the like, of one or more tasks, operations, and/or the like of one or more workloads performed by the system 300.

Although the system 300 illustrated in FIG. 3 is not limited to any specific type of workload, an embodiment that is configured for a recommendation model training workload may operate as follows. The workload may include one or more tasks such as the tasks illustrated in Table 1.

A workload may include a first task (1) that may be performed, for example, by one or more computational resources 327 of the computational storage device 304. The first task (1) may include a lookup operation (1a) in which the one or more computational resources 327 may read data (e.g., categorical input data) from one or more embedding tables 318 stored in storage media 312 of a storage device 304 as shown by arrow 329.

Additionally, or alternatively, the first task (1) may include an SLS calculation (1 b) in which the one or more computational resources 308 may use data obtained from one or more embedding tables 318 stored in storage media 312 of a storage device 304, for example, by a lookup operation (1a). In some embodiments, an SLS calculation may involve summing data read from one or more embedding tables 318. The SLS operation may generate output data 350 that may be stored, for example, in memory 338 of a computational storage device 304 as shown by arrow 343.

Depending on the implementation details, performing any of the first task (1), lookup operation (1a), and/or SLS calculation (1 b) at a computational storage device 304 at which input data for the task and/or operation is stored may reduce overhead, for example, because a computational storage device 304 may have an internal data path (e.g., between storage media 312 and computational resources 308) that may have a relatively high bandwidth.

In embodiments in which a computational storage device 304 includes memory 338, all or a portion of the memory 338 may be configured to operate as a cache 348 for the storage media 312. For example, most or all of the embedding tables, or portions thereof, used by the first task (1) may be stored in the storage media 312 of the storage device 304 which may have a relatively large storage capacity. Some of the embedding tables, or portions thereof, (e.g., more frequently accessed data which may be referred to as hot data) may be cached in a cache 348 of memory 338. In some embodiments, data in one or more embedding tables 318 stored in the storage media 312 of the storage device 304 may be transferred (e.g., copied) to the memory 338 of the computational storage device 304 as shown by arrow 346, for example, in response to a request to read data in one or more embedding tables 318 that is stored in storage media 312 but not in cache 348 (e.g., a cache miss). Similarly, in some embodiments, data may be transferred (e.g., copied) from memory 338 to storage media 312 as shown by arrow 356, for example, based on a write-back and/or a write-through operation of cache 348. In some embodiments, transferring data between storage media 312 and cache 348 may reduce overhead, for example, by exploiting an internal data path (e.g., between storage media 312 and memory 338) that may have a relatively high bandwidth.

In embodiments in which a computational storage device 304 includes memory 338, one or more of the first task (1), lookup operation (1a), and/or SLS calculation (1 b) may access data (e.g., embedding table data 344) stored in cache 348 as shown by arrow 345. Depending on the implementation details, this may reduce overhead, for example, because accessing data from memory 338 may be faster (e.g., have lower latency) than accessing data from storage media 312. In some embodiments, accessing data from cache 348 may be faster (e.g., have lower latency) than accessing data from storage media 312, for example, because memory 338 may have lower latency, and/or because it may exploit an internal data path (e.g., between memory 338 and one or more computational resources 327) that may have a relatively high bandwidth. Depending on the implementation details, overhead reduction resulting from accessing data in cache 348 may be in addition to overhead reduction resulting from performing any of the first task (1), lookup operation (1 a), and/or SLS calculation (1 b) at a computational storage device 304.

A workload may include a second task (2) that may be performed, for example, by one or more computational resources 314 of the GPU 306. A second task (2) may include one or more bottom multi-layer perceptron (MLP) operations that may operate, for example, using data (e.g., relatively dense features, continuous inputs, and/or the like) stored in memory 316.

The workload may include a third task (3) that may be performed, for example, by one or more computational resources 314 of the GPU 306. In some embodiments, the third task (3) may include one or more interaction operations (3a). One or more outputs from a bottom MLP operation may be used as one or more inputs to an interaction operation (3a). Additionally, or alternatively, SLS output data 350 from an SLS operation may be used as one or more inputs to an interaction operation (3a).

In some embodiments, SLS output data 350 from an SLS operation may be transferred (e.g., directly) from storage media 312 and/or from memory 338 of a computational storage device 304 to one or more computational resources 314 of a CPU 306 using interconnect fabric 324 as shown by arrow 352. For example, in some embodiments, interconnect fabric 324 may be configured to transfer SLS output data 350 from a computational storage device 304 directly to a CPU 306, for example, using a CXL switch, a PCIe root complex, a PCIe switch, PCIe peer-to-peer (P2P) communication, CXL P2P communication, and/or the like.

Depending on the implementation details, transferring data (e.g., directly) from a computational storage device 304 to a CPU 306 using interconnect fabric 324 may reduce overhead, for example, by reducing or eliminating CPU utilization and/or CPU utilization involved in copying data from a CPU to a CPU (e.g., CPU utilization and/or CPU utilization associated with transferring SLS output data 122 from a CPU 102 to a CPU 106 as illustrated in FIG. 1).

Additionally, or alternatively, the third task (3) may include one or more top MLP operations (3b). In some embodiments, one or more outputs from an interaction operation (3a) may be used as one or more inputs to a top MLP operation.

The workload may include a fourth task (4) that may be performed, for example, by one or more computational resources 314 of the CPU 306. A fourth task (4) may include one or more update operations for one or more top MLPs, for example, using backward pass information to adjust one or more parameters, weights, biases, and/or the like, of a top MLP.

The workload may include a fifth task (5) that may be performed, for example, by one or more computational resources 327 of a computational storage device 304. A fifth task (5) may include one or more embedding table update operations. An embedding table update operation may include one or more gradient calculations that may use output data 350 from one or more SLS operations and/or data from one or more embedding tables 318 and/or 344 as input. An embedding table update operation may include one or more write operations in which one or more outputs from one or more gradient calculations may be written to one or more embedding tables 318 in storage media 312 as shown by arrow 354 and/or to one or more embedding tables 344 in cache 348 of memory 338 as shown by arrow 347.

Depending on the implementation details, one or more write operations as shown by arrows 354 and/or 347 may reduce overhead associated with a write operation, for example, by exploiting one or more internal data paths (e.g., between computational resources 327 and storage media 312 as shown by arrow 354 and/or between computational resources 327 and memory 338 as shown by arrow 347) that may have a relatively high bandwidth.

A workload may include a sixth task (6) that may be performed, for example, by one or more computational resources 314 of a GPU 306. The sixth task (6) may include one or more update operations for one or more bottom MLPs, for example, using backward pass information to adjust one or more parameters, weights, biases, and/or the like, of a bottom MLP.

Table 2 illustrates a second embodiment of a recommendation model training workload in accordance with example embodiments of the disclosure. The embodiment illustrated in Table 2 may include one or more tasks that may be similar to those illustrated in Table 1. However, in the embodiment illustrated Table 2, a fifth task (5) may include a sparse adjustment operation (5b) in addition to one or more of a gradient computation operation (5a), and/or an embedding table write (5c).

In some embodiments, a sparse adjustment operation (5b) may adjust (e.g., optimize) one or more updates of one or more embedding tables. For example, in some embodiments, a sparse adjustment operation (5b) may involve sorting row indices, accumulating and/or merging gradient updates (e.g, for the same rows into one update), applying accumulated gradients, and/or the like. Depending on the implementation details, this may provide the determinism and/or accuracy (e.g., with a low performance overhead).

In some embodiments, any or all of task (1), task (5), operations (1a), (1 b), (5a), (5b), and/or (5c) may be performed by a computational storage device.

TABLE 2

| Task | Operation(s) | Pass |
|---|---|---|
| (1a) | Lookup | Forward |
| (1b) | Sparse Length Sum | |
| (2) | Bottom Multi-Layer Perceptron | |
| (3a) | Interaction | |
| (3b) | Top Multi-Layer Perceptron | |
| (4) | Top Multi-Layer Perceptron Update | Backward |
| (5a) | Gradient Computation | |
| (5b) | Sparse Adjustment | |

TABLE 2-continued

| Task | Operation(s) | Pass |
|---|---|---|
| (5c) | Embedding Table Update (Write) | |
| (6) | Bottom Multi-Layer Perceptron Update | |

Figure 4:
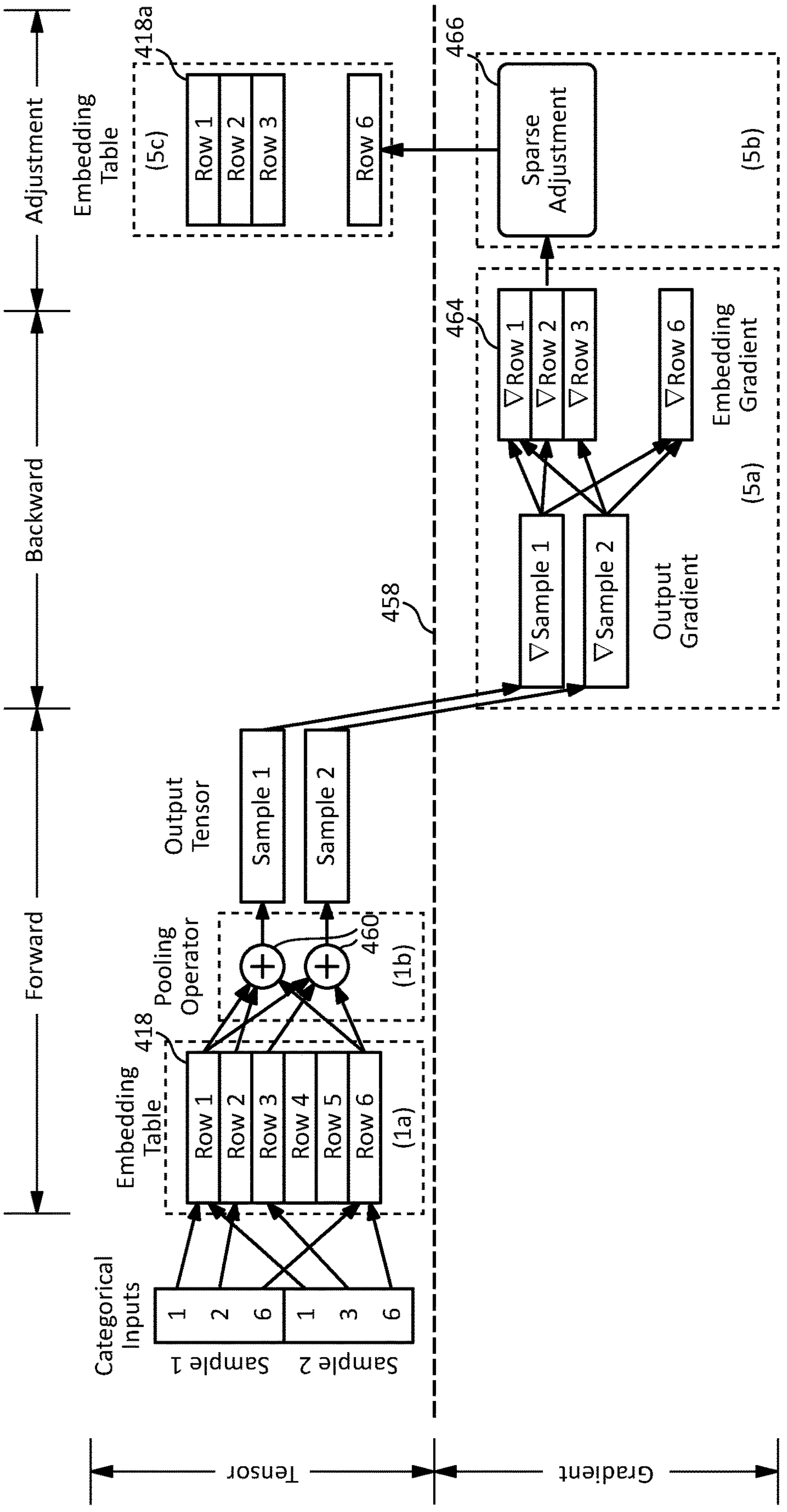
FIG. 4 illustrates an embodiment of a portion of a recommendation model training workload in accordance with example embodiments of the disclosure.

FIG. 4 illustrates an embodiment of a portion of a recommendation model training workload in accordance with example embodiments of the disclosure. The embodiment illustrated in FIG. 4 may be used, for example, to implement at least a portion of the workload illustrated in Table 2. For example, the embodiment illustrated in FIG. 4 may be used to implement some or all of task (1) and/or task (5) of Table 2.

Referring to FIG. 4, the region above the dashed line 458 may generally be considered tensor elements, whereas region below the dashed line 458 may generally be considered gradient elements. However, there may be overlap between the regions, both conceptually and in terms of implementation details.

One or more categorical inputs (e.g., Sample 1 which may include input values 1, 2, and/or 6 and/or Sample 2 which may include input values 1, 3, and/or 6) may be applied to one or more vectors (e.g., Row 1, . . . , Row 6) of embedding table 418. A lookup operation (which may correspond to task (1 a) in Table 2) may read one or more values (e.g., from one or more rows of embedding table 418) that may be applied to one or more pooling operators 460. The one or more pooling operators 460 may implement, for example, one or more SLS operations (which may correspond to task (1 b) in Table 2) to generate one or more output tensors (e.g., for Sample 1 and/or Sample 2).

In some embodiments, one or more gradient calculations and/or embedding gradient operations (which may correspond to task (5a) in Table 2) may be performed on the one or more output tensors (e.g., for Sample 1 and/or Sample 2) to generate gradients (e.g., ∇Sample 1 and/or ∇Sample 2) for embedding gradient(s) 464. A sparse adjustment operation 466 (which may correspond to task (5b) in Table 2) may be performed using the embedding gradient(s) 464 to generate update information **418*a* for one or more rows of embedding table 418. In some embodiments, a sparse adjustment operation may be implemented with a sparse optimization operation. An embedding table write operation (which may correspond to task (5c) in Table 2) may be performed to write the update information 418*a* to embedding table 418**.

Figure 5:
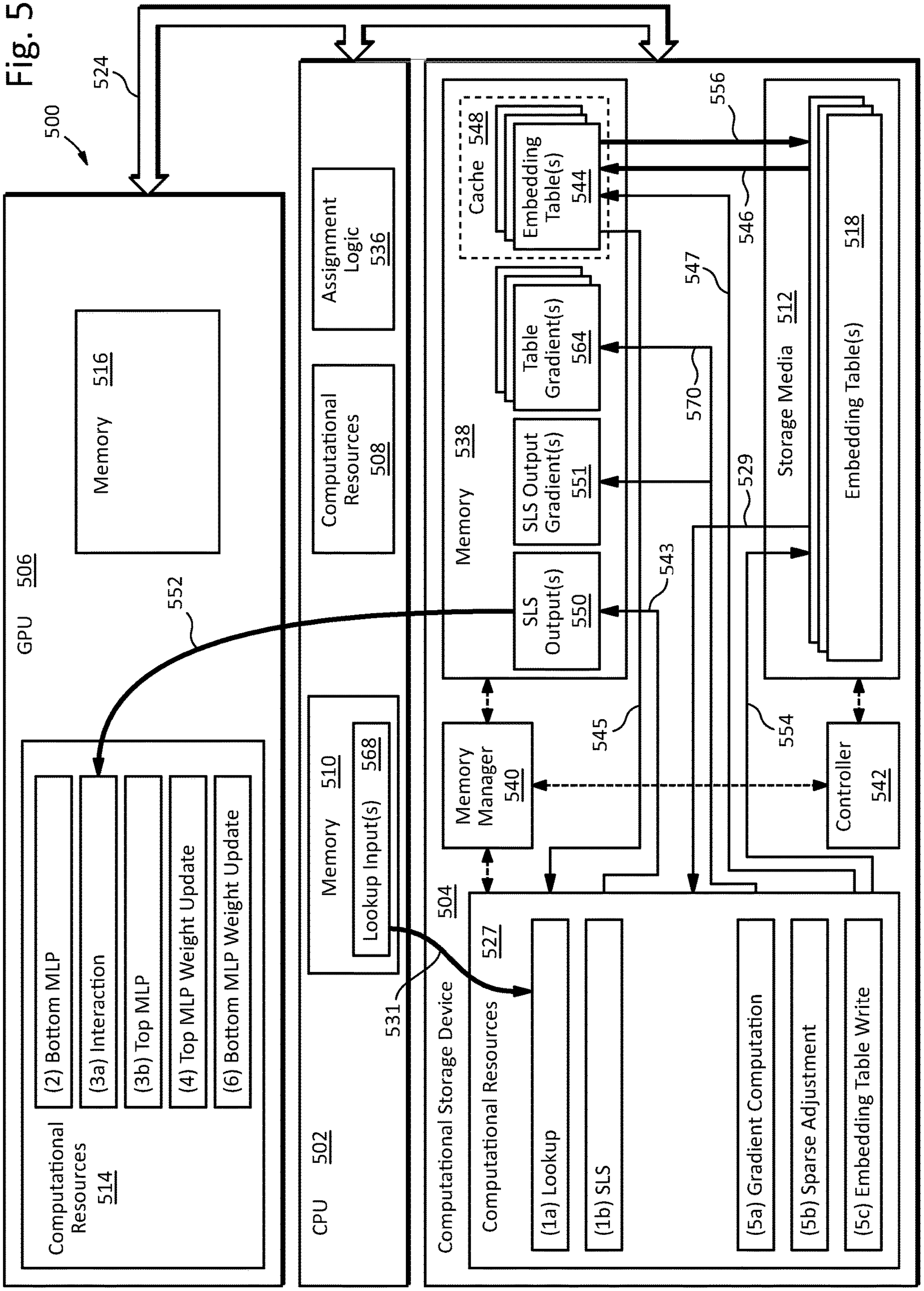
FIG. 5 illustrates a second example embodiment of a computational system including a computational storage device in accordance with example embodiments of the disclosure.

FIG. 5 illustrates a second example embodiment of a computational system including a computational storage device in accordance with example embodiments of the disclosure. The system 500 illustrated in FIG. 5 may be used, for example, to implement some or all of the system 200 illustrated in FIG. 2, the system 300 illustrated in FIG. 3, the workloads illustrated in Table 1, Table 2, and/or FIG. 4, and/or the like. For example, the computational storage device 504 illustrated in FIG. 5 may be used to perform one or more of the operations illustrated in FIG. 4.

For purposes of illustrating the inventive principles, the embodiment illustrated in FIG. 5 may be described in the context of certain implementation details such as a host implemented with a CPU, a computational device implemented with a GPU, a workload implemented as a recommendation model training workload, but the inventive principles are not limited to these or any other implementation details.

The system 500 illustrated in FIG. 5 may include one or more components and/or operations that may be the same as or similar to those illustrated in FIG. 2 and/or FIG. 3 and which may be indicated by reference numerals ending in the same digits. However, in the embodiment illustrated in FIG. 5, a CPU 502 may use one or more lookup inputs (e.g., embedding table indices) 568 stored in memory 510 to determine one or more embedding vectors (e.g., rows of one or more embedding tables 518 and/or 544) to access for a lookup operation (1a). One or more lookup inputs may be transferred (e.g., directly) from the CPU 502 to the computational storage device 504, for example, using the interconnect fabric 524 as shown by arrow 531.

Also in the system 500, one or more computational resources 527 of a computational storage device 504 may perform one or more gradient computation operations (5a), for example, as illustrated in FIG. 4, to generate SLS output gradients 551 and/or table gradients 564 which may be stored in memory 538 as shown by arrow 570. In some embodiments, one or more computational resources 527 may perform one or more sparse adjustment operations (5b), for example, using one or more sparse optimizers. In some embodiments, one or more computational resources 527 may perform one or more embedding table update operations (5c), for example, by writing update information to one or more of embedding tables 544 and/or 518 as shown by arrow 554.

Figure 6:
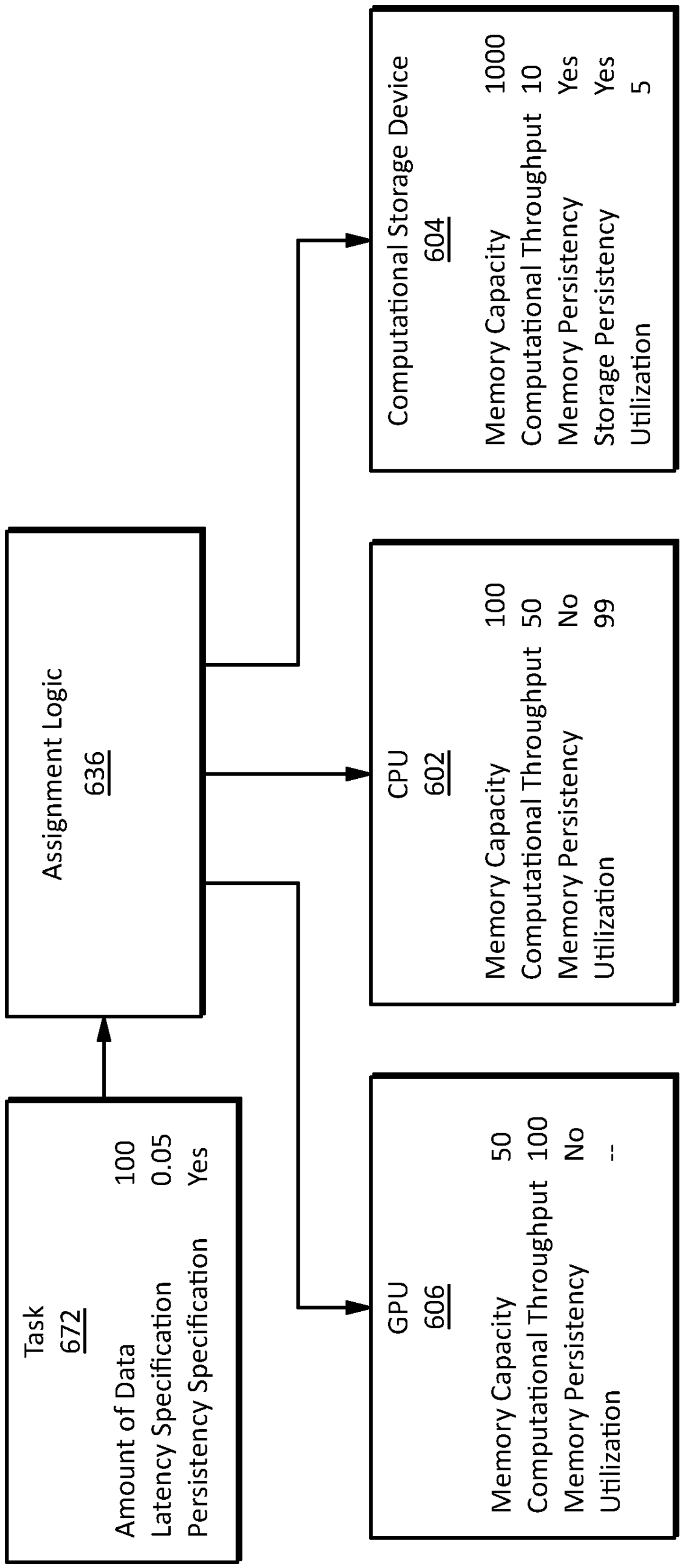
FIG. 6 illustrates an embodiment of an assignment scheme in accordance with example embodiments of the disclosure.

FIG. 6 illustrates an embodiment of an assignment scheme in accordance with example embodiments of the disclosure. The embodiment illustrated in FIG. 6 may be implemented, for example, by the assignment logic 336 illustrated in FIG. 3 and/or the assignment logic 536 illustrated in FIG. 5.

Referring to FIG. 6, assignment logic 636 may receive a task 672 of a workload to be performed by a system that may include one or more computational devices such as computational device 606, one or more CPUs 602, and/or one or more computational storage devices 604.

One or more of the computational devices 606, 602, and/or 604 may have one or more characteristics such as a memory and/or storage capacity, a processing capacity (e.g., a throughput, bandwidth, and/or the like), a persistency characteristic (e.g., nonvolatile and/or persistent memory and/or storage) and/or the like. In some embodiments, a capacity may refer to an available capacity (e.g., a portion of a total capacity that may not be used and/or allocated).

One or more of the computational devices 606, 602, and/or 604 may have one or more statuses such as a utilization level (e.g., a percentage of processing capacity being used).

The task 672 may have one or more characteristics such as an amount of data associated with the task (e.g., an amount of data that may be stored by a computational device), a latency specification, a persistency specification, and/or the like.

In some embodiments, the assignment logic 636 may assign the task to one or more of the computational devices 606, 602, and/or 604 based on one or more characteristics of the computational devices 606, 602, and/or 604 and/or one or more characteristics of the task 672. In some embodiments, assigning a task may refer to assigning as well as determining one or more of a scheduling, order, timing, and/or the like, of one or more tasks.

In some embodiments, assignment logic 636 may select one or more candidate computational devices for the task 672. For example, the task 672 may involve (e.g., require) 100 units (e.g., bytes (B), KB, MB, GB, TB, PB, and/or the like) of memory and/or storage to perform the task, and the computational devices 606, 602, and 604 may have available memory and/or storage capacities of 50 units, 100 units, and 1000 units, respectively. Thus, the assignment logic 636 may select a CPU 602 and a computational storage device 604 as candidates because they may have enough memory and/or storage capacity to accommodate the data size of the task 672.

Additionally, or alternatively, having selected two candidate computational devices 602 and 604, the assignment logic 636 may select one of the two candidate devices, for example, based on a latency specification of the task 672. For example, the task 672 may have a latency specification of 0.05 units (e.g., seconds (S), mS, pS, nS, pS, and/or the like), and the candidate computational devices 602 and 604 may have computational throughputs of 50 and 10, respectively. In some embodiments, a computational throughput may be related to a latency as a reciprocol such that computational throughputs of 50 and 10 may correspond to latencies of 0.02 and 0.10, respectivley. Thus, the assignment logic 636 may select the CPU 602 for the task 672 (e.g., assign the task 672 to the CPU 602, and, in some implementations, schedule the task 672 for the CPU 602) because the latency of 0.02 of the CPU 602 may be less than the latency specification of 0.05 for the task 672, whereas the latency of 0.10 of the computational storage device 604 may be greater than the latency specification of 0.05 for the task 672.

Additionally, or alternatively, having initially selected the CPU 602 for the task 672, the assignment logic 636 may modify the selection based, for example, on a utilization level of the CPU 602. For example, one or more computational resources within CPU 602 may have a current utilization level of 99 percent (e.g., may be 99 percent busy with other tasks), whereas one or more computational resources within a computational storage device 604 may have a utilization level of 5 percent. If the task 672 is assigned to the CPU 602, the task 672 may not perform acceptably because it may only have be able to utilize one percent of the computational resources within CPU 602. Thus, the assignment logic 636 may modify the selection to assign the task 672 to a computational storage device 604.

Additionally, or alternatively, assignment logic 636 may select, or modify a selection of, a computational device 606, 602, and/or 604 based on a persistency specification of the task 672. For example, a task 672 may have a data size of 10 units, a latency specification of 10 units, a specification that the data associated with the task be stored in persistent memory and/or storage. The computational devices 606, 602, and 604 may have available memory and/or storage capacities of 50 units, 100 units, and 1000 units, respectively, and have latency characteristics of 2 units, 5 units, and 100 units, respectively. Moreover, the available memory capacities of computational devices 606 and 602 may only include DRAM, whereas the available storage capacity of computational storage device 604 may include more than 10 units of nonvolatile memory. Thus, even though any of the computational devices 606, 602, and 604 may enough data capacity and/or processing throughput to accommodate the task 672, the assignment logic 636 may assign the task 672 to the computational storage device 604 (e.g., select the computational storage device 604) because it has enough persistent memory and/or storage to persistently store the data associated with the task 672.

Although the embodiments illustrated in FIG. 3 and/or FIG. 5 may show the assignment logic located at a host (e.g., CPU), in other embodiments, the assignment logic 636 may be located at a computational device, a computational storage device, and/or any other location. Moreover, in some embodiments, the assignment logic 636 may be distributed at multiple locations.

Figure 7:
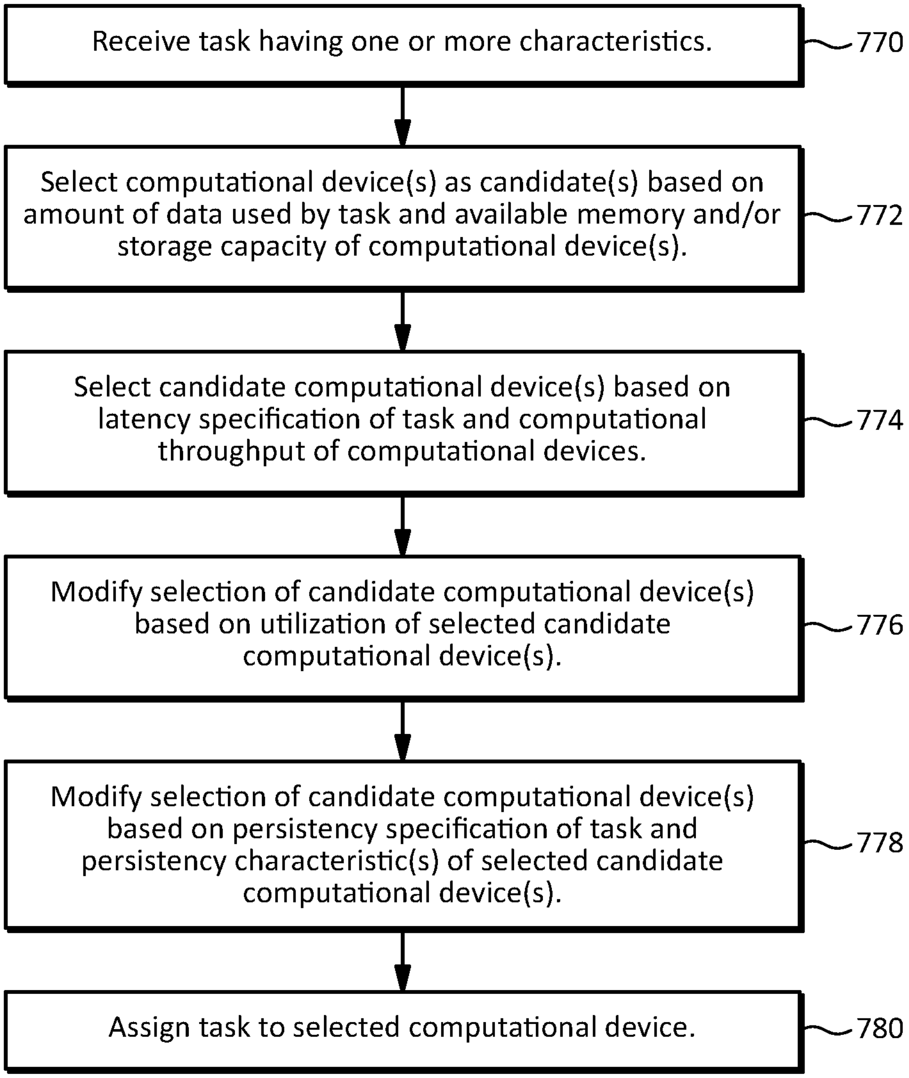
FIG. 7 illustrates an embodiment of a method for assigning a task to a computational device in accordance with example embodiments of the disclosure.

FIG. 7 illustrates an embodiment of a method for assigning a task to a computational device in accordance with example embodiments of the disclosure. The embodiment illustrated in FIG. 7 may be implemented with, or used to implement, any of the embodiments of assignment logic disclosed herein, including those illustrated in FIG. 3, FIG. 5, and/or FIG. 6.

Referring to FIG. 7, the method may begin at operation 770 where assignment logic may receive a task having one or more of an amount of data, a latency specification, and/or a persistency specification. At operation 772, the assignment logic may select one or more candidate computational devices based on an amount of data used by the task and an amount of available memory and/or storage capacity of the one or more candidate computational devices. For example, the assignment logic may select, as candidate devices, one or more computational devices that have enough memory and/or storage capacity to accommodate the amount of data used by the task. If no computational devices have adequate memory and/or storage capacity to accommodate the amount of data used by the task, the method may terminate with an error. If only one computational device has adequate memory and/or storage capacity to accommodate the amount of data used by the task, the assignment logic may assign the task to the one computational device and terminal the method.

At operation 774, the assignment logic may select one of the candidate computational devices based on a latency specification of the task and a computational throughput of one or more of the candidate computational devices. For example, the assignment logic may select a candidate computational device that may have the highest computational throughput, provided the highest throughput is adequate for the latency specification of the task. Alternatively, the assignment logic may select a candidate computational device that may have the lowest computational throughput that is still adequate for the latency specification of the task. If none of the candidate computational devices has a computational throughput that is adequate for the latency specification of the task, the method may terminate with an error.

At operation 776, the assignment logic may determine if an initially selected candidate computational device has a utilization (e.g., percent utilization) that may exceed a threshold. If the initially selected candidate computational device has a utilization that exceeds the threshold, the assignment logic may modify the selection by selecting a candidate computational device that may have a utilization that may not exceed the threshold. If none of the candidate computational devices has a utilization that does not exceed the threshold, the method may terminate with an error.

At operation 778, the assignment logic may modify a selection of a candidate computational device based on a persistency specification of the task and a persistency characteristic of an initially selected candidate computational device. For example, the task has persistency specification for data used by the task, and the initially selected candidate computational device does not have enough persistent memory and/or storage capacity for the data used by the task, the assignment logic may modify the selection by selecting a candidate computational device that may have a enough persistent memory and/or storage capacity to persistently store the data used by the task.

At operation 780, the assignment logic may assign the task to the selected candidate computational device. In some embodiments, the assignment logic may also determining one or more of a scheduling, order, timing, and/or the like, for the assigned task.

Table 3 illustrates an embodiment of a computational storage memory space in accordance with example embodiments of the disclosure. The embodiment illustrated in Table 3 may be implemented, for example, using a coherent interconnect, protocol, and/or the like, such as a CXL memory space.

TABLE 3

| Computational Storage Memory Space | |
|---|---|
| Shared Space (e.g., with Host and/or other Devices) | Private Space |

In some embodiments, the memory space map illustrated in FIG. 3 may be used in conjunction with one or more interconnect and/or protocol bias modes. For example, in an embodiment implemented with CXL, if data is accessed only or mostly by a computational storage device, data such as SLS output gradients, table gradients, and/or the like, may be stored in a private memory space and/or accessed in a device bias mode. Depending on the implementation details, this may improve performance, for example, because it may enable a computational device to access the data without checking one or more other memory spaces (e.g. caches).

As another example, in an embodiment implemented with CXL, if shared data may be read by a more than one device (e.g., a shared SLS output that may be rad by a CPU and a computational storage device), the shared data may be stored in a shared memory space (e.g., in the computational storage device) and/or accessed in a host bias mode.

Figure 8:
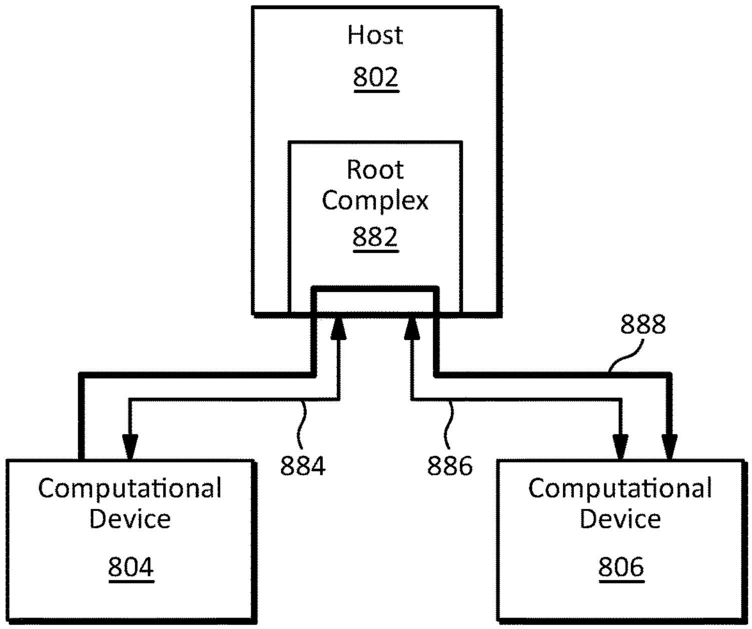
FIG. 8 illustrates a first example embodiment of an interconnect fabric in accordance with example embodiments of the disclosure.

FIG. 8 illustrates a first example embodiment of an interconnect fabric in accordance with example embodiments of the disclosure. The embodiment illustrated in FIG. 8 may be used, for example, to implement any of the an interconnect fabrics disclosed herein. For purposes of illustration, the embodiment illustrated in FIG. 8 may be described in the context of a one or more devices that may use a PCIe physical layer and/or one or more CXL protocols. The inventive principles, however, may be implemented with unlimited other interconnects, interfaces, protocols, and/or the like and are not limited to PCIe and/or CXL implementations.

The embodiment illustrated in FIG. 8 may include a host 802 (which may be implemented, for example, with a CPU) having root complex (e.g., a PCIe root complex) 882. A first computational device 804 may be configured as a first endpoint and connected to the root complex 882, for example, using one or more PCIe lanes 884. A second computational device 806 may be configured as a second endpoint and connected to the root complex 882, for example, using one or more PCIe lanes 886. In some embodiments, data may be transferred from the first computational device 804 to the second computational device 806 as shown by arrow 888, for example, directly in a manner that may involve little or no utilization of a CPU at the host 802. For example, the data transfer indicated by arrow 888 may be implemented using a PCIe peer-to-peer (P2P) feature, a CXL direct memory access feature (e.g., a P2P direct memory access feature), and/or the like.

The embodiment illustrated in FIG. 8 may be used, for example, to implement a transfer of SLS output data from a computational storage device to a CPU as illustrated by arrow 352 in FIG. 3 and/or arrow 552 in FIG. 5.

Figure 9:
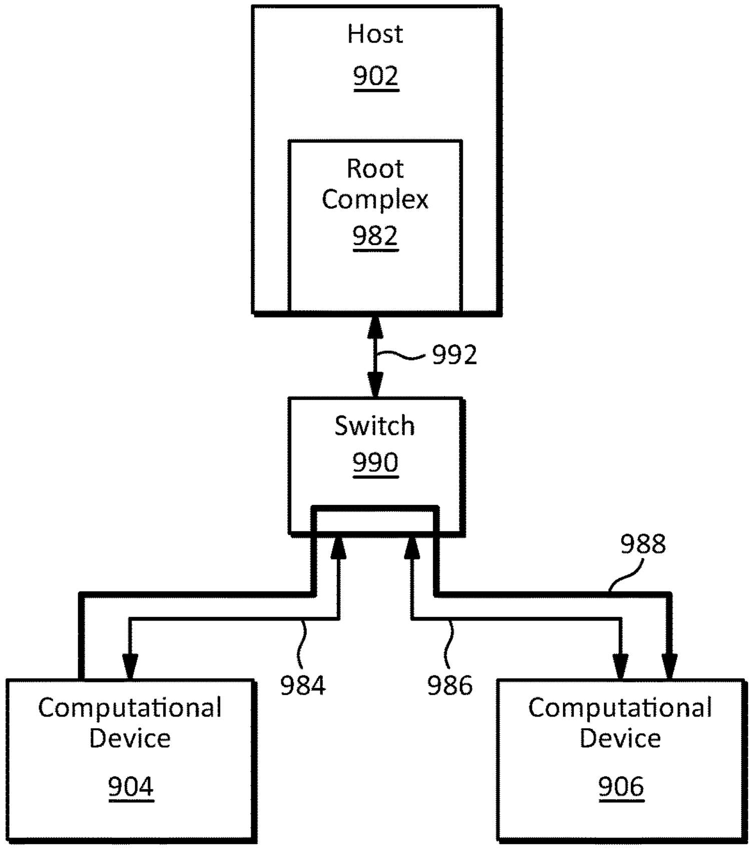
FIG. 9 illustrates a second example embodiment of an interconnect fabric in accordance with example embodiments of the disclosure.

FIG. 9 illustrates a second example embodiment of an interconnect fabric in accordance with example embodiments of the disclosure. The embodiment illustrated in FIG. 9 may be used, for example, to implement any of the an interconnect fabrics disclosed herein. For purposes of illustration, the embodiment illustrated in FIG. 9 may be described in the context of a one or more devices that may use a PCIe physical layer and/or one or more CXL protocols. The inventive principles, however, may be implemented with unlimited other interconnects, interfaces, protocols, and/or the like and are not limited to PCIe and/or CXL implementations.

The embodiment illustrated in FIG. 9 may include a host 902 (which may be implemented, for example, with a CPU) having root complex (e.g., a PCIe root complex) 982 and a switch 990 (e.g., a PCIe switch). The switch 990 may be connected to the root complex 982 using one or more PCIe lanes 992. A first computational device 904 may be configured as a first endpoint and connected to the switch 990, for example, using one or more PCIe lanes 984. A second computational device 906 may be configured as a second endpoint and connected to the switch 990, for example, using one or more PCIe lanes 986. In some embodiments, data may be transferred from the first computational device 904 to the second computational device 906 as shown by arrow 988, for example, directly in a manner that may involve little or no utilization of a CPU at the host 902. For example, the data transfer indicated by arrow 988 may be implemented using a PCIe peer-to-peer (P2P) feature, a CXL direct memory access feature (e.g., a P2P direct memory access feature), and/or the like.

The embodiment illustrated in FIG. 9 may be used, for example, to implement a transfer of SLS output data from a computational storage device to a GPU as illustrated by arrow 352 in FIG. 3 and/or arrow 552 in FIG. 5.

Figure 10:
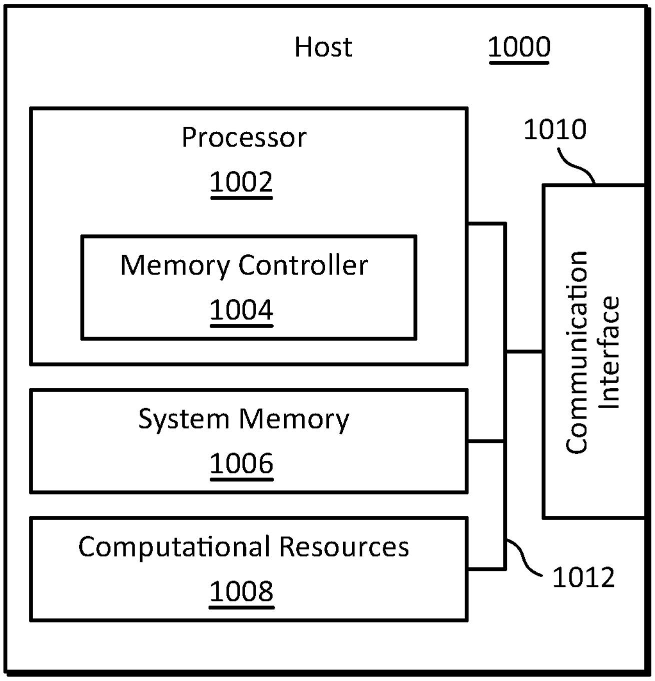
FIG. 10 illustrates an example embodiment of a host apparatus in accordance with example embodiments of the disclosure.
Figure 11:
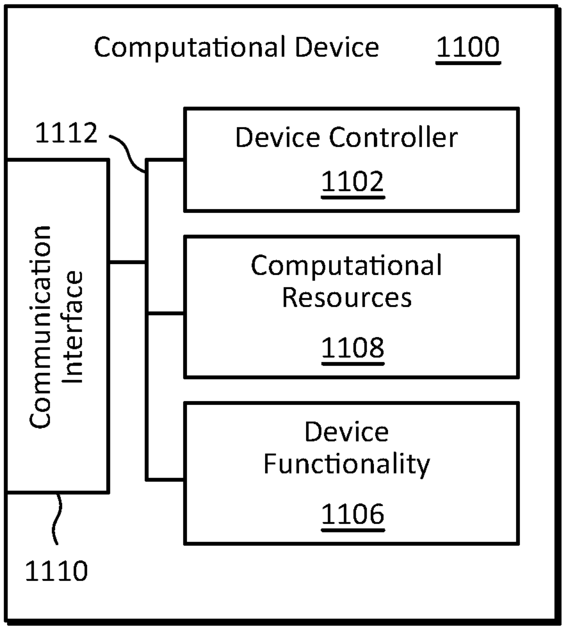
FIG. 11 illustrates an example embodiment of a computational device in accordance with example embodiments of the disclosure.

FIG. 10 illustrates an example embodiment of a host apparatus in accordance with example embodiments of the disclosure. The host apparatus illustrated in FIG. 10 may be used, for example, to implement any of the hosts disclosed herein. The host apparatus 1000 illustrated in FIG. 10 may include a processor 1002, which may include a memory controller 1004, a system memory 1006, one or more computational resources 1008, and/or communication interface 1010. Any or all of the components illustrated in FIG. 10 may communicate through one or more system buses 1012. In some embodiments, one or more of the components illustrated in FIG. 10 may be implemented using other components. In some embodiments, the one or more computational resources 1008 may implement any of the computational resources disclosed herein including, for example, any of the computational resources 508 illustrated in FIG. 5 and/or any computationa resources used to implement the CPU 602 illustrated in FIG. 6, FIG. 11 illustrates an example embodiment of a computational device in accordance with example embodiments of the disclosure. The embodiment 1100 illustrated in FIG. 11 may be used, for example, to implement any of the computational devices disclosed herein. The computational device 1100 may include a device controller 1102, one or more computational resources 1108, a device functionality circuit 1106, and a communication interface 1110. The components illustrated in FIG. 11 may communicate through one or more device buses 1112.

The device functionality circuit 1106 may include any hardware to implement the primary function of the device 1100. For example, if the device 1100 is implemented as a storage device, the device functionality circuit 1106 may include a storage medium such as one or more flash memory devices, an FTL, and/or the like. As another example, if the device 1100 is implemented as a network interface card (NIC), the device functionality circuit 1106 may include one or more modems, network interfaces, physical layers (PHYs), medium access control layers (MACs), and/or the like. As a further example, if the device 1100 is implemented as an accelerator, the device functionality circuit 1106 may include one or more accelerator circuits, memory circuits, and/or the like.

Any of the functionality described herein, including any of the host functionality, device functionally, and/or the like (e.g., the assignment logic 336, 536, and/or 636) as well as any of the functionality described with respect to the embodiments illustrated in FIGS. 1-11) may be implemented with hardware, software, firmware, or any combination thereof including, for example, hardware and/or software combinational logic, sequential logic, timers, counters, registers, state machines, volatile memories such DRAM and/or SRAM, nonvolatile memory including flash memory, persistent memory such as cross-gridded nonvolatile memory, memory with bulk resistance change, PCM, and/or the like and/or any combination thereof, complex programmable logic devices (CPLDs), FPGAs, ASICs, CPUs including CISC processors such as x86 processors and/or RISC processors such as ARM processors, GPUs, NPUs, TPUs, and/or the like, executing instructions stored in any type of memory. In some embodiments, one or more components may be implemented as a system-on-chip (SOC).

Figure 12:
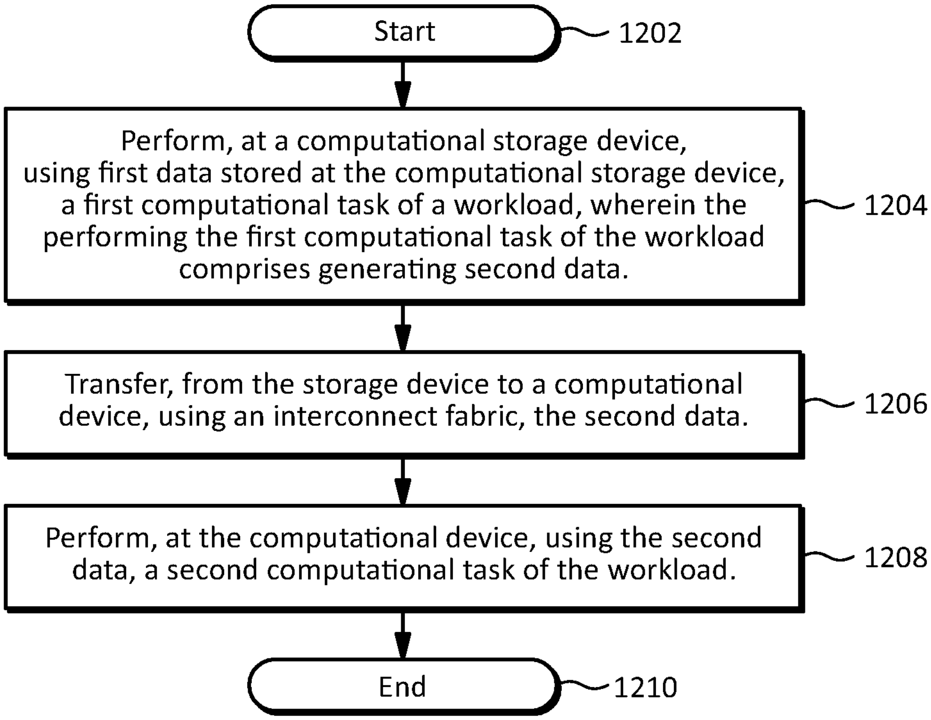
FIG. 12 illustrates an embodiment of a method for operating computational device in accordance with example embodiments of the disclosure.

FIG. 12 illustrates an embodiment of a method for operating computational device in accordance with example embodiments of the disclosure. The method may begin at operation 1202. At operation 1204, the method may perform, at a computational storage device, using first data stored at the computational storage device, a first computational task of a workload, wherein the performing the first computational task of the workload comprises generating second data. For example, in some embodiments, the workload may be implemented as a recommendation model training workload, and the first task may include performing an SLS operation on data stored in one or more embedding tables stored at the computational storage device to generate one or more SLS outputs as illustrated in FIG. 3 and/or FIG. 5.

At operation 1206, the method may transfer, from the storage device to a computational device, using an interconnect fabric, the second data. For example, one or more SLS outputs may be transferred to one or more computational resources of a GPU such as those illustrated in FIG. 3 and/or FIG. 5. At operation 1208, the method may perform, at the computational device, using the second data, a second computational task of the workload. For example, one or more computational resources of a GPU may be used to perform an interation using one or more SLS outputs as illustrated in FIG. 3 and/or FIG. 5. The method may end at operation 1210.

Figure 13:
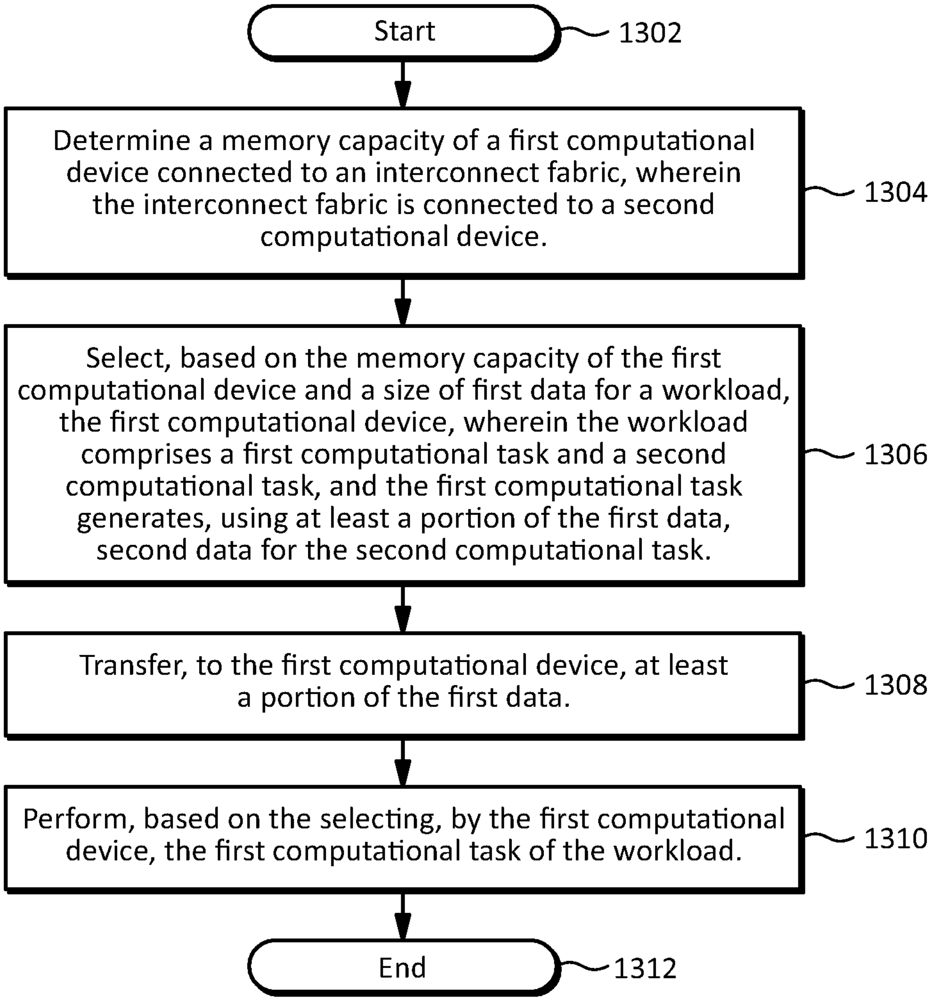
FIG. 13 illustrates an embodiment of a method for assigning a task to a computational device in accordance with example embodiments of the disclosure.

FIG. 13 illustrates an embodiment of a method for assigning a task to a computational device in accordance with example embodiments of the disclosure. The method may begin at operation 1302. At operation 1304, the method may determine a memory capacity of a first computational device connected to an interconnect fabric, wherein the interconnect fabric is connected to a second computational device. For example, assignment logic may determine a memory capacity of a GPU, a CPU, and/or a computational storage device as illustrated in FIG. 6.

At operation 1306, the method may select, based on the memory capacity of the first computational device and a size of first data for a workload, the first computational device, wherein the workload comprises a first computational task and a second computational task, and the first computational task generates, using at least a portion of the first data, second data for the second computational task. For example, assignment logic may assign a task 672 to a GPU, a CPU, and/or a computational storage device as illustrated in FIG. 6, wherein the workload may include a a first task 226 and a second task 234 as illustrated in FIG. 2.

At operation 1308, the method may transfer, to the first computational device, at least a portion of the first data. For example, data 230 may be transferred from a computational storage device 204 to a computational device 206 as illustrated in FIG. 2. At operation 1310, the method may perform, based on the selecting, by the first computational device, the first computational task of the workload. For example, one or more of the GPU, a CPU, and/or a computational storage device as illustrated in FIG. 6 may perform the task 672 assigned by the assignment logic 636 as illustrated in FIG. 6. The method may end at operation 1312.

The embodiment illustrated in FIG. 12, and FIG. 13, as well as all of the other embodiments described herein, are example operations and/or components. In some embodiments, some operations and/or components may be omitted and/or other operations and/or components may be included. Moreover, in some embodiments, the temporal and/or spatial order of the operations and/or components may be varied. Although some components and/or operations may be illustrated as individual components, in some embodiments, some components and/or operations shown separately may be integrated into single components and/or operations, and/or some components and/or operations shown as single components and/or operations may be implemented with multiple components and/or operations.

Some embodiments disclosed above have been described in the context of various implementation details, but the principles of this disclosure are not limited to these or any other specific details. For example, some functionality has been described as being implemented by certain components, but in other embodiments, the functionality may be distributed between different systems and components in different locations and having various user interfaces. Certain embodiments have been described as having specific processes, operations, etc., but these terms also encompass embodiments in which a specific process, operation, etc. may be implemented with multiple processes, operations, etc., or in which multiple processes, operations, etc. may be integrated into a single process, step, etc. A reference to a component or element may refer to only a portion of the component or element. For example, a reference to a block may refer to the entire block or one or more subblocks. A reference to a component or element may refer to one or more of the component or element, and a reference to plural components or elements may refer to a single component or element. For example, a reference to a resource may refer to one more resources, and a reference to resources may refer to a single resource. The use of terms such as "first" and "second" in this disclosure and the claims may only be for purposes of distinguishing the elements they modify and may not indicate any spatial or temporal order unless apparent otherwise from context. In some embodiments, a reference to an element may refer to at least a portion of the element, for example, "based on" may refer to "based at least in part on," and/or the like. A reference to a first element may not imply the existence of a second element. The principles disclosed herein have independent utility and may be embodied individually, and not every embodiment may utilize every principle. However, the principles may also be embodied in various combinations, some of which may amplify the benefits of the individual principles in a synergistic manner. The various details and embodiments described above may be combined to produce additional embodiments according to the inventive principles of this patent disclosure.

Since the inventive principles of this patent disclosure may be modified in arrangement and detail without departing from the inventive concepts, such changes and modifications are considered to fall within the scope of the following claims.

The invention claimed is:

1. A method comprising:

performing, at a storage device, using first data stored at the storage device, a first task of a workload, wherein the performing the first task of the workload comprises generating second data;

selecting an accelerator device to obtain a selected accelerator device based on a characteristic of the selected accelerator device accommodating a second task that follows the first task of the workload;

transferring, from the storage device to the selected accelerator device, using an interconnect fabric, the second data; and performing, at the accelerator device, using the second data, the second task of the workload;

wherein:

the first data comprises sparse data; and the second data comprises a dense representation of one or more features based on the sparse data.

2. The method of claim 1, further comprising assigning, based on a size of the first data and a memory capacity of the accelerator device, the first task of the workload.

3. The method of claim 1, further comprising, assigning, based on a performance characteristic of the first task of the workload, the first task of the workload.

4. The method of claim 1, further comprising, assigning, based on an operation status of the accelerator device, the first task of the workload.

5. The method of claim 1, wherein the interconnect fabric is connected to a host, the method further comprising assigning, based on a memory capacity of the host, the first task of the workload.

6. The method of claim 1, wherein the interconnect fabric is connected to a host, the method further comprising assigning, based on an operation status of the host, the first task of the workload.

7. The method of claim 1, wherein:

the workload comprises a machine learning workload; and the first task of the workload comprises a reduce operation.

8. The method of claim 1, wherein the first task of the workload comprises a sparse length sum operation.

9. The method of claim 1, further comprising performing, at the storage device, using the first data, a third task of the workload.

10. The method of claim 9, wherein:

the first data is stored, at least partially, in a data structure; and the third task of the workload comprises updating the data structure.

11. A storage device comprising:

a storage medium;

at least one computational resource;

an interconnect interface; and a control circuit configured to:

perform, using at least one of the at least one computational resource, using first data stored at the storage device, a task of a workload, wherein the task of the workload comprises generating second data;

select an accelerator device to obtain a selected accelerator device based on a characteristic of the selected accelerator device accommodating the workload; and transfer, from the storage device to the selected accelerator device, using the interconnect interface, the second data;

wherein:

the first data comprises sparse data; and the second data comprises a dense representation of one or more features based on the sparse data.

12. The storage device of claim 11, wherein the task comprises a first task of the workload, and the selected accelerator device is configured to perform, using at least one of the at least one computational resource, a second task of the workload.

13. The storage device of claim 12, wherein:

the first data is stored, at least partially, in a data structure; and the second task of the workload comprises updating the data structure.

14. The storage device of claim 12, wherein:

the first task of the workload comprises a summing operation; and the second task of the workload comprises a gradient operation.

15. A method comprising:

determining a memory capacity of a first accelerator device connected to an interconnect fabric, wherein the interconnect fabric is connected to a second accelerator device;

selecting, based on the memory capacity of the first accelerator device and a size of first data for a workload, the first accelerator device, wherein the workload comprises a first task and a second task, and the first task generates, using at least a portion of the first data, second data for the second task;

transferring, to the first accelerator device, the at least a portion of the first data; and performing, based on the selecting, by the first accelerator device, the first task of the workload;

wherein:

the at least the portion of the first data comprises sparse data; and the second data comprises a dense representation of one or more features based on the sparse data.

16. The method of claim 15, wherein the selecting the first accelerator device is further based on a performance characteristic of the first accelerator device and a performance characteristic of the first task of the workload.

17. The method of claim 16, wherein the performance characteristic of the first task of the workload comprises a latency characteristic.

18. The method of claim 15, wherein the selecting the first accelerator device is further based on an operating status of the first accelerator device.

19. The method of claim 18, wherein the operating status of the first accelerator device comprises a utilization of the first accelerator device.

20. The method of claim 15, wherein the selecting the first accelerator device is further based on a persistency characteristic of the first data.

* * * * *